United States Patent
Mitchell et al.

(10) Patent No.: US 10,681,020 B2
(45) Date of Patent: Jun. 9, 2020

(54) BLOCKCHAIN FORTIFIED AIRCRAFT COMMUNICATIONS ADDRESSING AND REPORTING SYSTEM (ACARS) COMMUNICATION

(71) Applicant: The Boeing Company, Chicago, IL (US)

(72) Inventors: Timothy M. Mitchell, Seattle, WA (US); Daniel Nguyen, Auburn, WA (US); Adonis X. Williams, Renton, WA (US); Michael R. Vanguardia, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 211 days.

(21) Appl. No.: 15/918,482

(22) Filed: Mar. 12, 2018

(65) Prior Publication Data

US 2019/0281026 A1 Sep. 12, 2019

(51) Int. Cl.
*H04L 29/06* (2006.01)
*H04W 4/42* (2018.01)
(Continued)

(52) U.S. Cl.
CPC ........ *H04L 63/0442* (2013.01); *H04L 9/0891* (2013.01); *H04L 9/3239* (2013.01);
(Continued)

(58) Field of Classification Search
CPC ... H04L 63/0442; H04L 63/12; H04L 9/0891; H04L 9/3239; H04L 2209/56;
(Continued)

(56) References Cited

U.S. PATENT DOCUMENTS 9,052,375 B2   6/2015 Sampigethaya et al.
9,794,059 B2   10/2017 Nguyen et al.
(Continued)

FOREIGN PATENT DOCUMENTS

WO   WO2017/091530 A1   6/2017

OTHER PUBLICATIONS

Olive, "ACARS Message Security (AMS) as a Vehicle for Validation of ICAO Doc. 9880 Part IV-B Security Requirements," Honeywell, ICAO ACP WG-M Meeting 14—Jun. 2-5, 2009.
(Continued)

*Primary Examiner* — Sarah Su
(74) *Attorney, Agent, or Firm* — MH2 Technology Law Group LLP

(57) ABSTRACT

Systems for and methods of securely communicating between a ground station and an aircraft are presented. The communications are among a plurality of nodes, including a ground based node and a plurality of aircraft based nodes. Each node stores at least a respective portion of a blockchain representing interactions among at least some of the nodes. Control nodes may initiate a privileged network action by: broadcasting to the plurality of control nodes a blockchain record representing the privileged network action, receiving from control nodes a plurality of votes representing validation results of the privileged network action, determining that a consensus from the control node votes indicates that the privileged action is permissible, and publishing to respective blockchain portions of each of the plurality of nodes a derivation of the blockchain record representing the privileged action, where the system implements the privileged action based on the determining.

20 Claims, 10 Drawing Sheets

(51) Int. Cl.
*H04L 9/08* (2006.01)
*H04W 12/04* (2009.01)
*H04W 12/06* (2009.01)
*H04L 9/32* (2006.01)
*G08G 5/00* (2006.01)
*H04B 7/185* (2006.01)

(52) U.S. Cl.
CPC ............... *H04L 63/12* (2013.01); *H04W 4/42* (2018.02); *H04W 12/04* (2013.01); *H04W 12/06* (2013.01); *G08G 5/0013* (2013.01); *H04B 7/18506* (2013.01); *H04L 2209/56* (2013.01); *H04L 2209/80* (2013.01); *H04L 2209/84* (2013.01)

(58) Field of Classification Search
CPC .. H04L 2209/80; H04L 2209/84; H04W 4/42; H04W 12/04; H04W 12/06; G08G 5/0013; H04B 7/18506
See application file for complete search history.

(56) References Cited

U.S. PATENT DOCUMENTS

| | | | |
|---|---|---|---|
| 2018/0123804 A1* | 5/2018 | Smith | G06F 21/44 |
| 2018/0270244 A1* | 9/2018 | Kumar | B64C 39/024 |
| 2019/0013948 A1* | 1/2019 | Mercuri | G06Q 20/02 |
| 2019/0109713 A1* | 4/2019 | Clark | G06Q 20/36 |
| 2019/0238337 A1* | 8/2019 | Laremenko | G06Q 20/06 |
| 2019/0251573 A1* | 8/2019 | Toyota | G06Q 10/105 |
| 2019/0280871 A1* | 9/2019 | Subramanian | H04L 9/0637 |
| 2019/0349426 A1* | 11/2019 | Smith | H04W 4/08 |

OTHER PUBLICATIONS

Blue Horizon, "Docs," 3 pages, https://bluehorizon.network/documentation/blockchain, downloaded Mar. 12, 2018.

ConsenSys Media, Glossary, "About Ethereum," https://consensys.net/ethereum, download Mar. 12, 2018, 4 pages.

Beame Blog, "PKI Based Identity on a Blockchain," https://www.beame.wiki, Aug. 15, 2017/.

Greenspan, "MultiChain Private Blockchain—White Paper," Jun. 2015, pp. 1-17.

Gutirrez, "Boeing Improves Operations with Blockchain and the Internet of Things," May 24, 2017, downloaded from https://www.altoros.com/blog/boeing-improves-operations-with-blockchain-and-the-internet-of-things/, 7 pages.

Extended European Search Report dated Aug. 7, 2019 in corresponding European Application No. 19162142.4, 6 pages.

ICAO's Strategic Objectives, https://www.icao.int/Pages/default.aspx, homepage, 2 pages, retrieved on Mar. 12, 2018.

\* cited by examiner

| FN-A ID | FN-A OnPubK(message) | CN OnPrivK(CN ID) | Transaction ID |

↗
402

| CN ID | CN OnPubK(message) | FN-A OnPrivK(FN-A ID) | Transaction ID |

| FN-A ID | FN-A OffPubK | FN-A OnPubK | CN OnPrivK(CVAL) | Add | Transaction ID |

↗
502

| FN-A ID | FN-A OffPubK | FN-A OnPubK | Transaction ID |

| FN-A ID | FN-A OnPubK | Rekey | CN OnPrivK(CN ID) | Transaction ID |

↗
802

| FN-A ID | FN-A OffPrivK(FN-A OnPubKey) | Rekey | Transaction ID |

↗
804

| FN-A ID | FN-A OffPubK | FN-A OnPubKey | Transaction ID |

| FN-A ID | FN-A OffPrivK(FN-A OnPubK) | Rekey | Transaction ID |

↗
1002

| FN-A ID | FN-A OffPubK | FN-A OnPubK | Transaction ID |

BLOCKCHAIN FORTIFIED AIRCRAFT COMMUNICATIONS ADDRESSING AND REPORTING SYSTEM (ACARS) COMMUNICATION

FIELD

This disclosure relates generally to sending data to, from, or within an aircraft in a secure manner.

BACKGROUND

Electrical systems of aircraft and other specialized vehicles typically include line-replaceable units (LRUs). LRUs are modular electronics systems, which perform various vehicle operations. LRUs generally have input and output electrical connections and an internal bus, typically a serial bus.

Aircraft Communications Addressing and Reporting System (ACARS) is a digital datalink technique and set of standards for transmission of messages between aircraft and ground station and between different intra-aircraft LRUs. An example ACARS standard is the ARINC 429 Specification, available from Rockwell Collins. ACARS may be used for one-way communication or, by using multiple unidirectional systems, two-way communication. ACARS messages typically consist of one or more 32-bit "words", each of which may include one or more predefined fields that each may contain data values.

Blockchain technology is used to form decentralized cryptocurrency computer networks such as that for Bitcoin. In such networks, blockchains are used to prevent double spending of the cryptocurrency. In general, blockchains function as distributed ledgers, which can track cryptocurrency transactions.

SUMMARY

According to various embodiments, a system for securely communicating between a ground station and an aircraft is disclosed. The system includes a plurality of nodes, the plurality of nodes being communicatively interconnected and including at least one ground based node and a plurality of aircraft based nodes, each of the plurality of nodes including a persistent memory storing at least a respective portion of a blockchain representing interactions among at least some of the plurality of nodes, each of the plurality of nodes including a logical partition including an online logical part storing an online asymmetric key pair including an online public key and an online private key and an offline logical part storing an offline asymmetric key pair including an offline public key and an offline private key; where the plurality of nodes include a plurality of control nodes, each of the plurality of control nodes configured to initiate a privileged network action by: broadcasting to the plurality of control nodes a blockchain record representing the privileged network action; receiving from the plurality of control nodes a plurality of votes representing validation results of the privileged network action; determining that a consensus from the plurality of control node votes indicates that the privileged action is permissible; and publishing to respective blockchain portions of each of the plurality of nodes a derivation of the blockchain record representing the privileged action; where the system implements the privileged action based on the determining.

Various optional features of the above embodiments include the following. At least some of the plurality of aircraft based nodes may include Aircraft Communications Addressing and Reporting System (ACARS) line replaceable units (LRUs). The privileged network action may include sending a secure inter-node communication from a sender node to a destination node; where the blockchain record representing the privileged action includes an identification of the destination node, a message payload encrypted using an online public key of the destination node, and an identification of the sender node encrypted using an online private key of the sender node; and where each of the control nodes determines a vote of the plurality of votes by retrieving an online public key and using it to decrypt the identification of the sender node. The privileged action may include registering a new node; where the blockchain record representing the privileged action includes an identification of the new node, an offline public key of the new node, an online public key of the new node, and a connect value encrypted using an online public key of a respective control node of the broadcasting; and where each of the control nodes determines a vote of the plurality of votes by using a respective online private key to decrypt the connect value. The plurality of nodes may further include a plurality of fixed nodes, each of the plurality of fixed nodes configured to initiate a non-privileged action. The privileged action may include revoking a key of a particular fixed node by a revoking control node; where the blockchain record representing the privileged action includes an identification of the particular fixed node, an identification of a key pair to be revoked, and an identification of the revoking control node encrypted using a private key of the revoking control node; and where each of the control nodes determines a vote of the plurality of votes at least by decrypting the identification of the revoking control node. The privileged action may include revoking a key of a particular fixed node by the particular fixed node; where the blockchain record representing the privileged action includes an identification of the particular fixed node, an identification of an online key pair to be revoked encrypted using an offline private key of the particular fixed node; and where each of the control nodes determines a vote of the plurality of votes at least by decrypting the identification of the online key pair to be revoked. The privileged action may include rekeying a key of a particular fixed node initiated by a rekeying control node; where the blockchain record representing the privileged action includes an identification of the particular fixed node, an online public key of the particular fixed node, and an identification of the rekeying control node encrypted using an online private key of the rekeying control node; where each of the control nodes determines a vote of the plurality of votes at least by decrypting the identification of the rekeying control node; where the particular fixed node is configured to, after the determining and before the publishing, write a rekey success blockchain record including an identification of the particular fixed node and a new online public key of the particular fixed node encrypted using an offline private key of the particular fixed node; and where the derivation of the blockchain record representing the privileged action includes an ID of the particular fixed node, a new online public key of the particular fixed node, and an offline public key of the particular fixed node. The non-privileged action may include a self-initiated rekeying by a particular fixed node, the self-initiated rekeying of the particular fixed node including: broadcasting to the plurality of control nodes a blockchain record representing the self-initiated rekeying, the blockchain record including an identification of the particular fixed node, and an online public key of the particular fixed node encrypted using an offline private key of the particular fixed node; and publishing to respective blockchain portions of each of the plurality of nodes a blockchain record including an identification of the particular fixed node, a new online public key of the particular fixed node, and a new offline public key of the particular fixed node. Each of the respective portions of the blockchain may themselves include a blockchain representing network actions involving a respective node.

According to various embodiments, a method of securely communicating between a ground station and an aircraft among a plurality of nodes, the plurality of nodes are communicatively interconnected and including at least one ground based node and a plurality of aircraft based nodes, each of the plurality of nodes including a persistent memory storing at least a respective portion of a blockchain representing interactions among at least some of the plurality of nodes, each of the plurality of nodes including a logical partition including an online logical part storing an online asymmetric key pair including an online public key and an online private key and an offline logical part storing an offline asymmetric key pair including an offline public key and an offline private key, where the plurality of nodes include a plurality of control nodes, is disclosed. Each of the plurality of control nodes is configured to initiate a privileged network action by: broadcasting to the plurality of control nodes a blockchain record representing the privileged network action; receiving from the plurality of control nodes a plurality of votes representing validation results of the privileged network action; determining that a consensus from the plurality of control node votes indicates that the privileged action is permissible; and publishing to respective blockchain portions of each of the plurality of nodes a derivation of the blockchain record representing the privileged action; where the privileged action is implemented based on the determining.

Various optional features of the above embodiments include the following. At least some of the plurality of aircraft based nodes may include Aircraft Communications Addressing and Reporting System (ACARS) line replaceable units (LRUs). The privileged network action may include sending a secure inter-node communication from a sender node to a destination node; where the blockchain record representing the privileged action includes an identification of the destination node, a message payload encrypted using an online public key of the destination node, and an identification of the sender node encrypted using an online private key of the sender node; and where each of the control nodes determines a vote of the plurality of votes by retrieving an online public key and using it to decrypt the identification of the sender node. The privileged action may include registering a new node; where the blockchain record representing the privileged action includes an identification of the new node, an offline public key of the new node, an online public key of the new node, and a connect value encrypted using an online public key of a respective control node of the broadcasting; and where each of the control nodes determines a vote of the plurality of votes by using a respective online private key to decrypt the connect value. The plurality of nodes may further include a plurality of fixed nodes, each of the plurality of fixed nodes configured to initiate a non-privileged action. The privileged action may include revoking a key of a particular fixed node by a revoking control node; where the blockchain record representing the privileged action includes an identification of the particular fixed node, an identification of a key pair to be revoked, and an identification of the revoking control node encrypted using a private key of the revoking control node; and where each of the control nodes determines a vote of the plurality of votes at least by decrypting the identification of the revoking control node. The privileged action may include revoking a key of a particular fixed node by the particular fixed node; where the blockchain record representing the privileged action includes an identification of the particular fixed node, an identification of an online key pair to be revoked encrypted using an offline private key of the particular fixed node; and where each of the control nodes determines a vote of the plurality of votes at least by decrypting the identification of the online key pair to be revoked. The privileged action may include rekeying a key of a particular fixed node initiated by a rekeying control node; where the blockchain record representing the privileged action includes an identification of the particular fixed node, an online public key of the particular fixed node, and an identification of the rekeying control node encrypted using an online private key of the rekeying control node; and where each of the control nodes determines a vote of the plurality of votes at least by decrypting the identification of the rekeying control node; the method further including, after the determining and before the publishing, writing, by the particular fixed node, a rekey success blockchain record including an identification of the particular fixed node and a new online public key of the particular fixed node encrypted using an offline private key of the particular fixed node; where the derivation of the blockchain record representing the privileged action includes an ID of the particular fixed node, a new online public key of the particular fixed node, and an offline public key of the particular fixed node. The non-privileged action may include a self-initiated rekeying by a particular fixed node, the self-initiated rekeying of the particular fixed node including: broadcasting to the plurality of control nodes a blockchain record representing the self-initiated rekeying, the blockchain record including an identification of the particular fixed node, and an online public key of the particular fixed node encrypted using an offline private key of the particular fixed node; and publishing to respective blockchain portions of each of the plurality of nodes a blockchain record including an identification of the particular fixed node, a new online public key of the particular fixed node, and a new offline public key of the particular fixed node. Each of the respective portions of the blockchain may themselves include a blockchain representing network actions involving a respective node.

Some embodiments have pronounced advantages over prior art techniques. Some embodiments thwart an attack vector that is otherwise available against existing aircraft communications systems, namely, the so-called man-in-the-middle attack. By using a blockchain to identify and validate both the sender and the receiver of each communication, some embodiments are able to successfully prevent man-in-the-middle attacks. Some embodiments adapt blockchain technology for use with aircraft communications such that attacks by malicious actors, even in the case that a minority of control nodes are compromised, are prevented.

BRIEF DESCRIPTION OF THE DRAWINGS

Various features of the examples can be more fully appreciated, as the examples become better understood with reference to the following detailed description, when considered in connection with the accompanying figures, in which:

FIG. 4 is a schematic diagram of blockchain records for blockchain fortified secure aircraft communications according to some embodiments;

FIG. 5 is a schematic diagram of blockchain records for blockchain fortified new node registration according to some embodiments;

FIG. 8 is a schematic diagram of blockchain records for blockchain fortified control-node-initiated fixed node rekeying according to some embodiments;

FIG. 10 is a schematic diagram of blockchain records for blockchain fortified self-initiated fixed node rekeying according to some embodiments.

DESCRIPTION

Reference will now be made in detail to the disclosed examples, which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific examples. These examples are described in sufficient detail to enable those skilled in the art to practice them and it is to be understood that other examples may be utilized and that changes may be made without departing from the scope of the disclosure. The following description is, therefore, merely exemplary.

Systems for, and methods of, securing aircraft communications using blockchain technology are disclosed. In particular, embodiments may utilize asymmetric cryptography and blockchain technology to secure an ACARS-type system against malicious or rogue actors. Embodiments may include a plurality of communicatively coupled nodes. In order to isolate system management tasks from communications tasks, each node may include a logical partition into an online part and an offline part. Examples of nodes contemplated for use with embodiments include ACARS LRUs and ground stations that communication with aircraft ACARS systems. Ground station nodes may each have a copy of the complete blockchain ledger, so that any of them can validate the authenticity and legitimacy of transactions throughout the ledger. Such nodes may be considered privileged according to some embodiments, and they may perform a number of critical tasks to maintain the integrity of the chain, so long as there is a supporting majority vote and a quorum to act. Nodes aboard aircraft, and some ground station nodes, may store only a portion of the complete blockchain ledger as it relates to actions that involve them. Such nodes are considered non-privileged according to some embodiments, and they may only perform administrative tasks for themselves, as opposed to for other nodes. These and other features are disclosed in detail herein.

Figure 1:
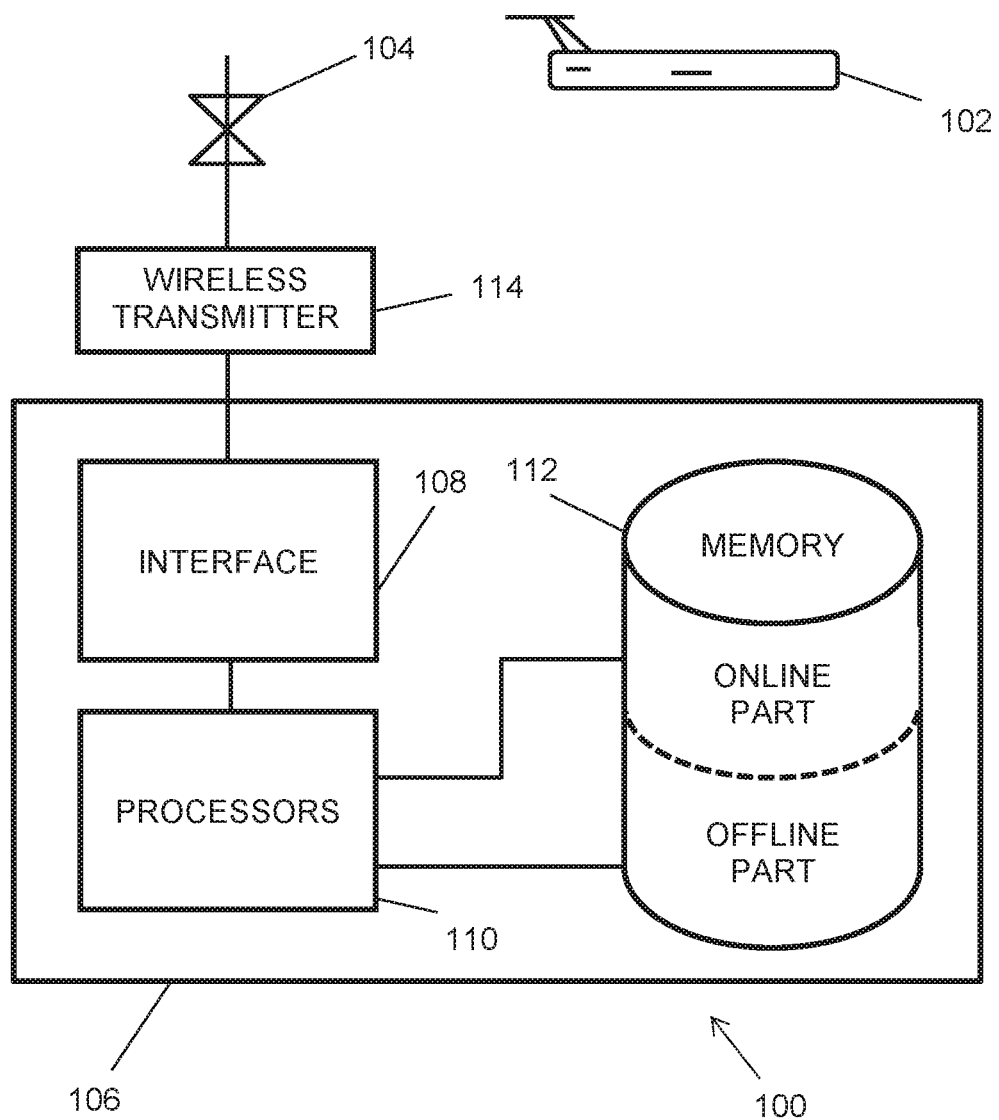
FIG. 1 is a schematic diagram of a system according to various embodiments.

FIG. 1 is a schematic diagram of a system according to various embodiments. The techniques disclosed herein, e.g., in reference to FIGS. 3-10, may be implemented using the system shown and described in reference to FIG. 1. In particular, FIG. 1 depicts aircraft 102 in communication with ground station 106. Aircraft 102 may be any type of aircraft, not limited to fixed-wing airplanes. Thus, aircraft 102 may be a helicopter, for example. Ground station 106 may be included within, or distinct from, a terrestrial air traffic control system.

Aircraft 102 may include an ACARS system that itself includes a plurality of ACARS LRUs. ACARS messages sent from a ground station to an aircraft may pass through the aircraft LRUs sequentially, e.g., from a least-critical LRU to a most-critical LRU. Each aircraft LRU is considered a "node" as that term is used herein.

Ground station 106 may include one or more electronic processors 110, communicatively coupled to computer readable media (e.g., persistent memory 112) and interface 108. Processor(s) 110 may form part of an electronic computer, for example. Interface 108 may include a signal amplifier and any other electronic componentry to ensure that signals from ground station 106 are conveyed to a destination, such as wireless transmitter 114. Wireless transmitter 114 may be coupled to antenna 104, which sends and receives data wirelessly to and from aircraft 102. Persistent memory 112 may include computer-interpretable instructions which, when executed by processor(s) 110, cause ground station 106 to perform one or more of the techniques disclosed herein, e.g., the technique shown and described in referent to any of FIGS. 3-10. Ground station 106 is considered a "node" as that term is used herein.

Each node, whether a ground station, an LRU, or a different type of node, may include a logical partition of its memory and processing hardware. Such a partition may have at least two parts: an online part, and an offline part. Each part stores an asymmetric cryptography key pair consisting of a public key and a private key. The keys from the online logical part may be used for system tasks, such as communications between nodes. The keys from the offline logical part may be used for system administration and maintenance purposes, such as for node online key pair revocation, node online key pair rekeying, and new node registration. The offline logical part may be physical. That is, the offline logical part may have a completely different attack surface in comparison to the online logical part. The offline logical part may be disconnected from any network, such as the internet. The offline keys may only be replaceable by direct physical interface with the node, e.g., by connecting to it via a USB port, for example.

Nodes may be of two different types, referred to herein as "control nodes" and "fixed nodes". Control nodes are considered privileged and therefore may handle both privileged and non-privileged actions. For example, according to some embodiments, control nodes can read and write information, vote as to the validity of an action, determine a validity consensus from a plurality of received votes, add or remove a node from the network, revoke any node's online key pair, initiate any node's rekeying, and send privileged or non-privileged communications to another node. Fixed nodes generally have less processing power, memory, and other resources in comparison to control nodes. According to some embodiments, fixed nodes can read and write information, revoke their own online key pair, rekey their own online key pair, and send non-privileged communications to any other node. In general, fixed nodes may be on board aircraft and be implemented as ACARS LRUs, and control nodes may be implemented as ACARS communications ground stations; however, these examples are not intended to be limiting. Note that fixed nodes may include processors such as processors 110, persistent memory such as persistent memory 112, including the disclosed logical partition as disclosed above, and a communications interface, such as interface 108, e.g., for communicating with other nodes such as LRUs. That is, the basic logical structure of any node may be as shown and described herein in reference to ground station 106.

Figure 2:
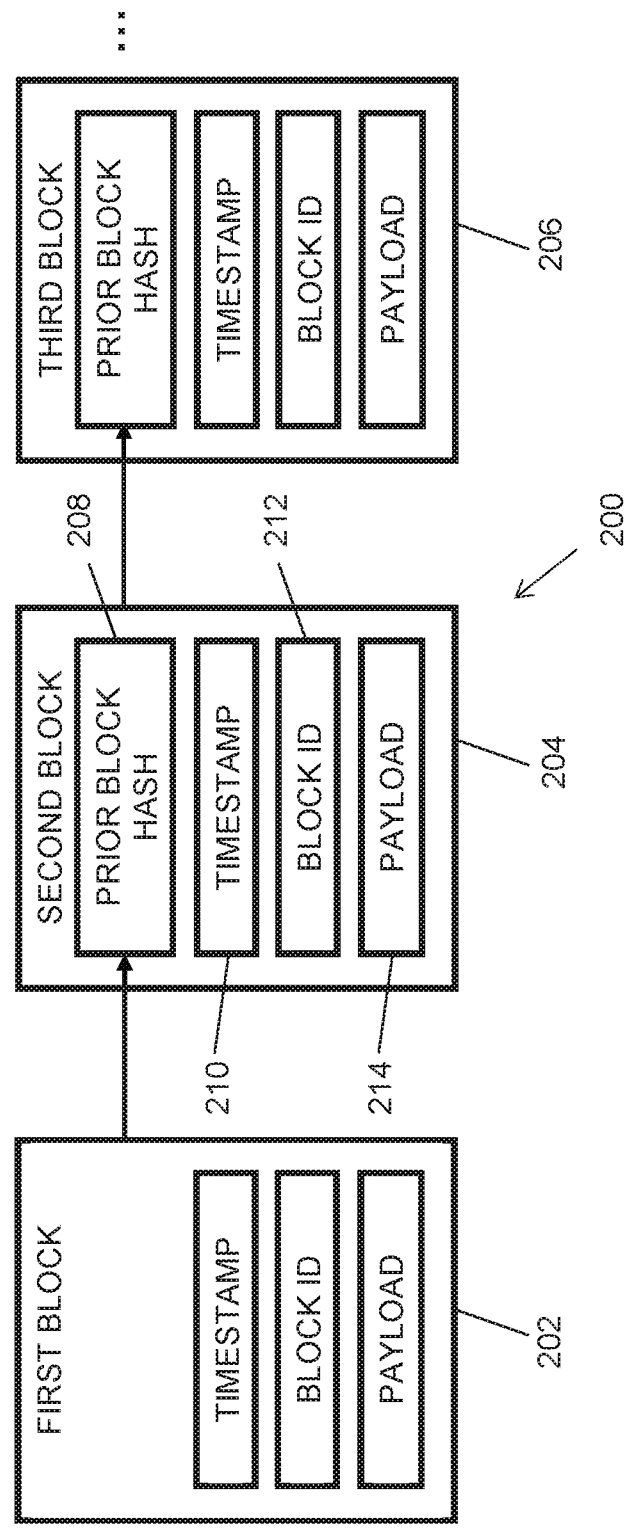
FIG. 2 is a schematic diagram of a blockchain according to various embodiments.

FIG. 2 is a schematic diagram of a blockchain 200 according to various embodiments. In general, a blockchain is a distributed readable and writeable computer interpretable data structure stored in persistent memory and used to track transactions or other actions. A blockchain may be constructed of individual logical blocks 202, 204, 206. Each block may include any, or a combination, of: a timestamp 210 representing a time of the block's creation, a block identification 212, which may be a sequential number or a unique serial number, and a payload 214, which can include any arbitrary information. According to some embodiments, the payload can be the contents of a message. According to some embodiments, the payload can be a Merkle tree constructed of multiple sub-payloads. According to some embodiments, the payload can itself be a standalone block chain. The payload data, or data intended to be inserted as payload data, are referred to herein as payload "records". Each block in the chain, except the first block, also includes a cryptographic hash value 208 of contents from the previous block, e.g., a cryptographic hash of the entirety of the previous block's contents.

Each node may store one or both of a complete blockchain representing all actions from among all nodes in a particular network, and an individual blockchain representing all actions that involve that particular node. According to some embodiments, the complete blockchain may include blocks whose payloads are themselves individual blockchains for nodes in the network. In general, control nodes may store a complete blockchain, whereas fixed nodes may store an individual blockchain. The nodes may store their respective blockchains in their offline logical part, for example.

The usage of, and entries to, blockchains according to various embodiments, are disclosed in detail below in reference to FIGS. 3-10.

Figure 3:
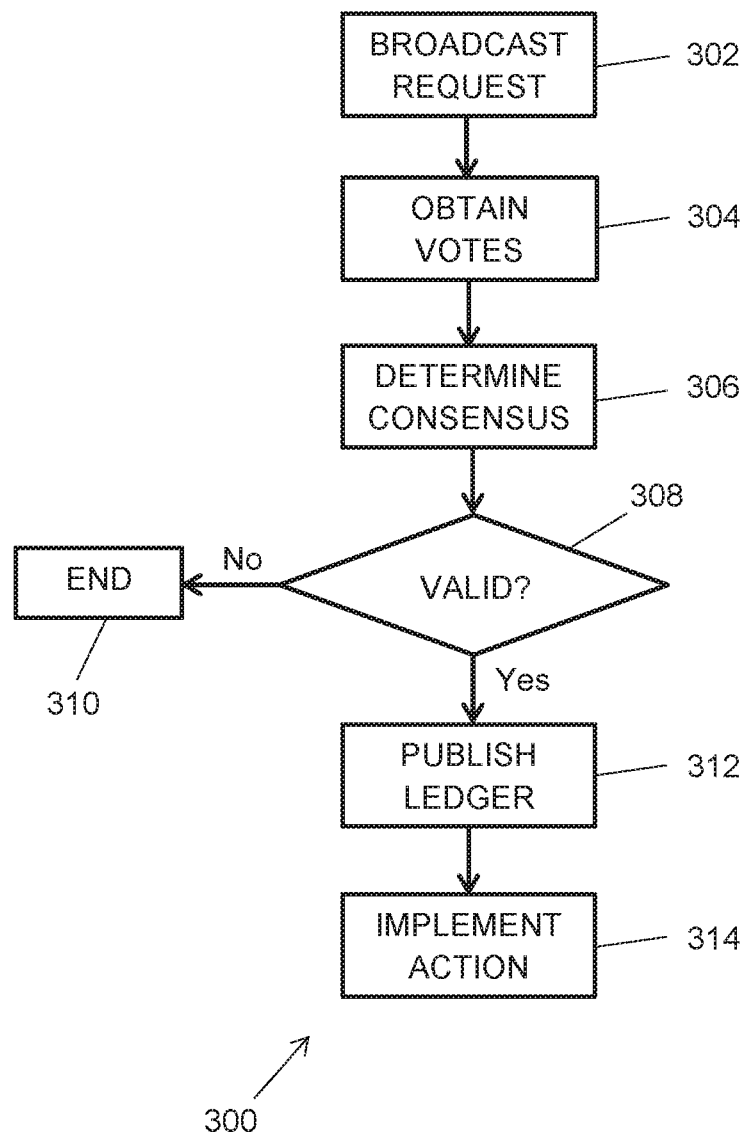
FIG. 3 is a flowchart of a method of blockchain fortified privileged aircraft communication according to various embodiments.

FIG. 3 is a flowchart of a method 300 of blockchain fortified privileged aircraft communication according to various embodiments. Method 300 may be implemented by a control node in concert with other nodes in an aircraft communications network, such as an ACARS network. For example, method 300 may be practiced using system 100 of FIG. 1.

At block 302, a control node in an aircraft communications system broadcasts a request. The request may be in the form of a blockchain record or other ledger entry or data representing the requested action. The request may be broadcast to all nodes in the aircraft communications system, or to all control nodes in the network. For example, if the action to be taken is a privileged action, then the request may be sent to only the control nodes; whereas if the action is not a privileged action, then the request may be sent to all nodes. The request may be any of a variety of types. Example requests include requests to: read or write information, add or remove a fixed node from the network, revoke a fixed node's online key pair, initiate a fixed node's rekeying, and send privileged or non-privileged communications to another node. Detailed examples of the use and functionality of these request types according to various embodiments are presented below in reference to FIGS. 4-10.

At block 304, the node that broadcast the request at block 302 receives response votes from the other nodes in its network. According to some embodiments, only control nodes are permitted to vote. The voting nodes convey their votes to the requesting node using standard network protocol, e.g., ACARS messaging. Each response represents the particular responding node's evaluation as to whether the request is valid. The specific manner in which the voting nodes evaluate the request's validity may depend on the type of request. Detailed examples of the use and functionality of these request types according to various embodiments are presented below in reference to FIGS. 4-10.

At block 306, the requesting node determines a consensus from the received votes. The consensus determination may be made according to a variety of techniques. According to some embodiments, a consensus determination is made based on the majority of votes, i.e., the consensus is the majority vote. According to some embodiments, a consensus determination is based on fewer than a given number or percentage of dissenting votes, e.g., the consensus is the majority vote as long as the number or proportion of dissenting votes does not exceed some threshold. According to some embodiments, only unanimous votes are treated as a consensus.

At block 308, if the consensus is that the request is valid, then control passes to block 312. Otherwise, control passes to block 310, and method 300 may terminate, possibly sending (e.g., via email, text, or ACARS messaging) an error message to a system administrator and/or aircraft pilot.

At block 312, aircraft communication network publishes a record reflecting the requested action in the blockchain. The publishing may include generating a new block for the blockchain and broadcasting it to each node, or each control node, in the system. If the action is privileged, then the message may be sent to only the control nodes; if the action is not privileged, then the message may be sent to all nodes. The receiving nodes may receive the block and add it to their stored blockchains (or, for nodes that store individual blockchains, add the received block to their blockchain portions). The publishing may also include adding the generated block to the requesting node's stored blockchain (or blockchain portion).

At block 314, the system implements the requested action. The particular implementation may depend on the requested action. In some embodiments, the actions of this block merge with the actions of block 312. Detailed descriptions of example implementation according to various embodiments are presented below in reference to FIGS. 4-9.

Figure 9:
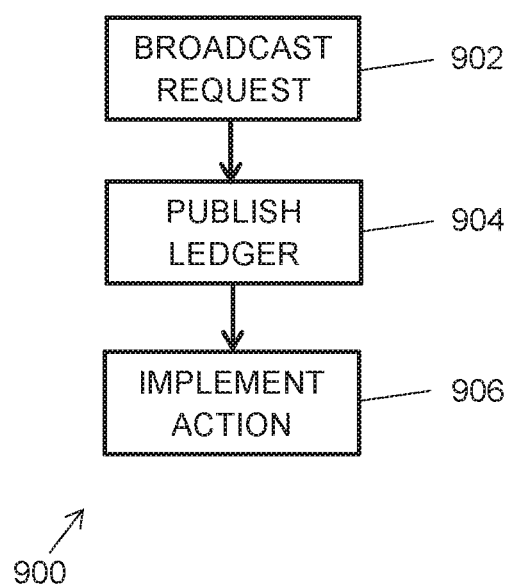
FIG. 9 is a flowchart of a method of blockchain fortified self-initiated fixed node rekeying according to various embodiments.

Thus, as indicated above, method 300 may be applied with particular parameters and actions in order to affect any of a number of forms of specialized communicative actions, including: secure communications from a privileged node to any other node (shown and described below in reference to FIG. 4), registering a new node (shown and described below in reference to FIG. 5), initiating, by a control node, key revocation of any other node's online key pair (shown and described below in reference to FIG. 6), self-initiated online key pair revocation by any node (shown and described below in reference to FIG. 7), initiating, by a control node, re-keying of any other node (shown and described below in reference to FIG. 8), and initiating self re-keying by any fixed node (shown and described below in reference to FIGS. 9 and 10). Detailed explanations of these particular embodiments are presented below.

Regarding notation for FIGS. 3-9, this document refers to the online public keys as "OnPubK", the online private keys as "OnPrivK", the offline public keys as "OffPubK", and the offline private keys as "OffPrivK" when the owner of the key is clear from context. To explicitly denote the key owner, the key notation is preceded by "FN" for the respective fixed node or "CN" for the respective control node, e.g., "CN OnPubK" for a control node's online public key. Further, using a key K to encrypt or decrypt data D is denoted as "K(D)", where the cryptographic algorithm may be any suitable algorithm, e.g., RSA, el Gamal, elliptic curves, etc. In general, fixed nodes are denoted as "FN", and control nodes are denoted as "CN". Specific nodes may be denoted as suffixes to the node type indications, e.g., "FN-A" refers to a fixed node identified as "A", compared to a different fixed node "FN-B" identified as "B".

FIG. 4 is a schematic diagram of blockchain records 402, 404 for blockchain fortified secure aircraft communications according to some embodiments. Method 300 of FIG. 3 may be adapted for secure communications between any two nodes through the use of blockchain records 402, 404 as shown and described presently. The particular steps may depend in part on whether a control node or a fixed node is the message sender.

As part of block 302 for sending secure communications, the sending node obtains a copy of the receiving node's online public key (OnPubK). The sending node uses this key to encrypt the message, e.g., by directly encrypting the message using asymmetric cryptography, or by generating a symmetric key, using it to encrypt the message, encrypting the symmetric cryptography key using the online public key, and packaging the encrypted symmetric key and the encrypted message together using hybrid asymmetric/symmetric cryptography. (Throughout this disclosure, the phrase "encrypting [data] using [asymmetric key]" means either directly encrypting [data] using [symmetric key] as described, or encrypting [data] using a symmetric key by way of hybrid cryptography, as described.)

Further, the sending node encrypts a copy of its own node ID using its online private key (OnPrivK). Later, the voting nodes will use this datum to determine the validity of the request.

The sending node then forms a blockchain record (or other data structure including the noted information) that may include the following four fields: the ID of the sending node, the message encrypted as described above, the encrypted sending node's ID as described above, and a transaction ID, which may be a number in a sequence, a unique serial number, a hash of the record, or any other sufficient identification datum. Suitable formats for the secure communications fixed node blockchain record 402 and for the secure communications control node blockchain record 404 are shown in FIG. 4. That is, for secure communications initiated by a control node, the format of blockchain record 402 may be used, and for secure communications initiated by a fixed node, the format of blockchain record 404 may be used. The sending node then broadcasts its request to at least the intended recipient node.

If the message is intended as privileged, then the recipient node may retrieve the online public key of the sending node and decrypt the message. For non-privileged messages, the communication method may end at this point. For privileged communications, the following may be performed as well.

As part of block 304 for sending privileged secure communications, voting nodes analyze their respective copy of the blockchain record broadcast per block 302 to determine whether it represents a valid request. To do so, each voting node uses the sending node's ID in the blockchain record to obtain a copy of the sending node's online public key, which the voting node uses to decrypt the sending node's ID that has been encrypted using the corresponding online private key of the sending node. To determine whether the requested action is valid, the voting node compares the decrypted sending node's ID to the sending node's ID as retrieved from the blockchain. If they match, then the voting node votes that the request is valid. Otherwise, the voting nodes votes that the request is invalid.

The actions of blocks 306, 308, and 310 for secure aircraft communications are as described above in reference to FIG. 3.

As part of block 312 for secure communications, the nodes publish the record to their respective blockchains. Control nodes may do so by including the record in a new block and adding it to their copy of the full blockchain; fixed nodes may add such a block to their individual (partial) copies.

Finally, as part of block 314 for sending secure communications, the network implements the action. For sending a secure communication, the actions of this block include the receiving node decrypting the message using its online private key.

FIG. 5 is a schematic diagram of blockchain records 502, 504 for blockchain fortified new node registration according to some embodiments. Method 300 of FIG. 3 may be adapted for registering a new fixed node, i.e., adding a fixed node to the network, through the use of blockchain records 502, 504 as shown and described presently. The registration may be initiated by a control node.

As part of block 302 for registering a new fixed node, the initiating control node forms and broadcasts a blockchain record (or equivalent information). The blockchain record includes entries for: an ID of the added fixed node, an offline public key for the new fixed node, an online public key for the new fixed node, a connect value encrypted using the online private key of the requesting control node, an identification of the action to be taken (i.e., "ADD" a node) and a transaction ID. The transaction ID may be as described above in reference to FIG. 4. The connect value, denoted "CVAL", may be a secret value, such as a random number, symmetric key, or passphrase. The CVAL may be loaded onto software or firmware of the fixed node to be added, prior to the registration process. An example format suitable for a new-node-request blockchain record 502 is show in FIG. 5.

As part of block 304 for adding a node, the voting nodes each retrieve a copy of the online public key of the requesting control node and use it to decrypt the encrypted CVAL. Each voting node additionally retrieves a copy of the CVAL from the new fixed node, and compares it to the decrypted CVAL. If they match, then the voting node votes that the request is valid. Otherwise, the voting nodes votes that the request is invalid. Note that, according to some embodiments, instead of the CVAL being encrypted and decrypted using the online key pair of the requesting control node, the CVAL is encrypted and decrypted using an online key pair that is shared among all control nodes (but not fixed nodes). Such a key pair may be provisioned in a particular control node upon establishment of the node as a control node.

The actions of blocks 306, 308, and 310 for new fixed node registration are as described above in reference to FIG. 3.

As part of block 312 for adding a fixed node, the nodes publish a blockchain record that represents blockchain record 502 to their respective blockchains. Control nodes may do so by including the representational record in a new block and adding it to their copy of the full blockchain; fixed nodes may add such a block to their individual (partial) copies of the blockchain. An example format suitable for recording as a new-node blockchain record 504 is shown in FIG. 5. Note that blockchain record 504 for recording is derived from blockchain record 502 for requesting by extracting the ID of the added fixed node, the offline public key for the new fixed node, the online public key for the new fixed node, and a transaction ID, and forming a new, representational, record from these data. This new record may be published per block 312.

Finally, as part of block 314 for adding a node, the system implements the addition of the node. For adding a node, the actions of this block are essentially the same as those of block 312. In particular, the publication of blockchain records 504 means that the new node has been added to the network. Some embodiments may subsequently broadcast hardware specifications, e.g., memory capacity, CPU speed, etc. per this block.

Figure 6:
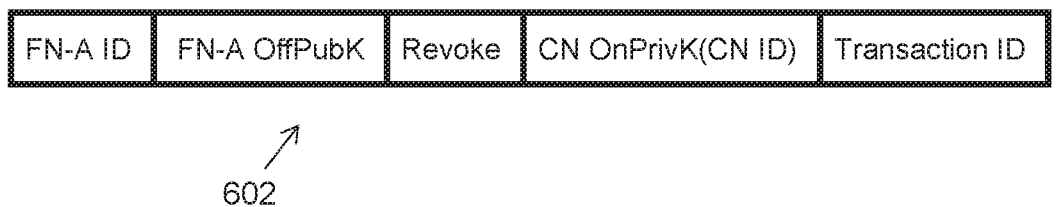
FIG. 6 is a schematic diagram of a blockchain record for blockchain fortified control-node-initiated fixed node online key pair revocation according to some embodiments.

FIG. 6 is a schematic diagram of a blockchain record 602 for blockchain fortified control-node-initiated fixed node online key pair revocation according to some embodiments. That is, method 300 of FIG. 3 may be adapted for a control node to revoke a fixed node's online key pair by using blockchain record 602 as shown and described presently.

As part of block 302 for revoking a fixed node's online key pair, the requesting control node forms and broadcasts a blockchain record, or equivalent information, representing the revocation. An example format suitable for a requesting online key pair revocation blockchain record 602 is show in FIG. 6. The record includes entries of: an ID of the fixed node which online key pair is to be revoked, a copy of the offline public key to be revoked, an identification of the action to be taken (i.e., "revoke" a fixed node's online key pair), a copy of the requesting control node's ID encrypted using the online private key of the requesting control node, and a transaction ID. The transaction ID may be as described above in reference to FIG. 4.

As part of block 304 for revoking a key pair, voting nodes analyze their respective copy of the blockchain record broadcast per block 302 to determine whether it represents a valid request. To do so, each voting node obtains a copy of the sending node's online public key, which the voting node uses to decrypt the sending node's ID that has been encrypted using the corresponding online private key of the sending node. To determine whether the requested action is valid, the voting node compares the decrypted sending node's ID to the sending node's ID as retrieved from the blockchain. If they match, then the voting node votes that the request is valid. Otherwise, the voting nodes votes that the request is invalid.

The actions of blocks 306, 308, and 310 for control-node-initiated fixed node online key pair revocation are as described above in reference to FIG. 3.

As part of block 312 for control-node-initiated fixed node online key pair revocation, the nodes publish blockchain record 602 or equivalent information. Control nodes may do so by including the representational record in a new block and adding it to their copy of the full blockchain; fixed nodes may add such a block to their individual (partial) copies.

As part of block 314 for online key pair revocation, the network implements the requested action. For online key pair revocation, this can take the form of a node not using an expired key pair of the fixed node due to the presence of the published blockchain record indicating the expiration.

Figure 7:
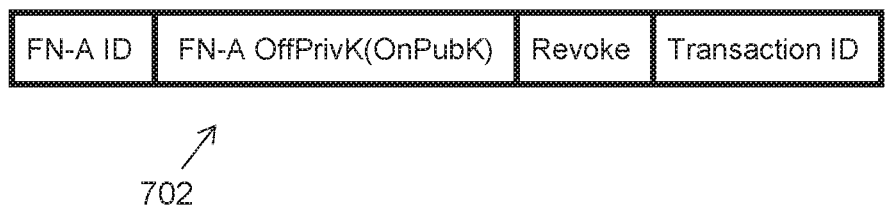
FIG. 7 is a schematic diagram of a blockchain record for blockchain fortified self-initiated fixed node online key pair revocation according to some embodiments.

FIG. 7 is a schematic diagram of a blockchain record 702 for blockchain fortified self-initiated fixed node online key pair revocation according to some embodiments. That is, method 300 of FIG. 3 may be adapted for a fixed node to revoke its own online key pair by using blockchain record 702 as shown and described presently.

As part of block 302 for a fixed node self-revoking its online key pair, the fixed node forms and broadcasts a blockchain record, or equivalent information, representing the revocation. An example format suitable for such a blockchain record 702 is show in FIG. 7. Blockchain record 702 includes entries of: an ID of the fixed node which online key pair is to be revoked, a copy of the online public key to be revoked, encrypted using the offline private key of the self-revoking fixed node, an identification of the action to be taken (i.e., "revoke" a fixed node's online key pair), and a transaction ID. The transaction ID may be as described above in reference to FIG. 4.

As part of block 304 for self-revocation of a fixed node's online a key pair, voting nodes analyze their respective copy of the blockchain record broadcast per block 302 to determine whether it represents a valid request. To do so, each voting node obtains a copy of the sending node's online public key from the blockchain, using the ID of the fixed node as an index. The voting nodes then use the online public key to decrypt the sending node's ID that has been encrypted using the corresponding online private key. To determine whether the requested action is valid, the voting nodes compare the decrypted ID to the fixed node's ID as retrieved from the blockchain. If they match, then the voting node votes that the request is valid. Otherwise, the voting nodes votes that the request is invalid.

The actions of blocks 306, 308, and 310 for self-initiated fixed node online key pair revocation are as described above in reference to FIG. 3.

As part of block 312 for self-initiated fixed node online key pair revocation, the nodes publish blockchain record 702 or equivalent information. Control nodes may do so by including the representational record in a new block and adding it to their copy of the full blockchain; fixed nodes may add such a block to their individual (partial) copies.

As part of block 314 for self-initiated fixed node online key pair revocation, the network implements the requested action. For online key pair revocation, this can take the form of a node not using an expired key pair of the fixed node due to the presence of the published blockchain record indicating the expiration.

FIG. 8 is a schematic diagram of blockchain records 802, 804, 806 for blockchain fortified control-node-initiated fixed node online key pair rekeying according to some embodiments. That is, method 300 of FIG. 3 may be adapted for a control node to revoke a fixed node's online key pair by using blockchain records 802, 804, 806 as shown and described presently.

As part of block 302 for a control node revoking a particular fixed node's online key pair, the control node forms and broadcasts a blockchain record, or equivalent information, representing the rekeying. An example format suitable for such a blockchain record 802 is show in FIG. 8. Blockchain record 802 includes entries of: an ID of the particular fixed node which online key pair is to be rekeyed, a copy of the current online public key of the key pair to be rekeyed, an identification of the action to be taken (i.e., "rekey" the particular fixed node's online key pair), a copy of the initiating control node's ID encrypted using the initiating control node's online private key, and a transaction ID. The transaction ID may be as described above in reference to FIG. 4.

As part of block 304 for control-node-initiated rekeying of a fixed node's online key pair, voting nodes analyze their respective copy of the blockchain record broadcast per block 302 to determine whether it represents a valid request. To do so, each voting node obtains a copy of the initiating control node's online public key from the blockchain. The voting nodes then use the online public key to decrypt the initiating control node's ID that has been encrypted using the corresponding online private key. To determine whether the requested action is valid, the voting node compares the decrypted ID to the initiating control node's ID as retrieved from the blockchain. If they match, then the voting node votes that the request is valid. Otherwise, the voting nodes votes that the request is invalid.

The actions of blocks 306, 308, and 310 for control-node-initiated fixed node online key pair rekeying are as described above in reference to FIG. 3.

After the actions of block 308, but before the actions of block 312, for control-node-initiated fixed node online key pair rekeying, the particular fixed node generates a new online key pair. The particular fixed node then writes a rekey success blockchain record 804 to its blockchain. The rekey success blockchain record 804 includes: an identification of the particular fixed node, the newly generated online public key of the particular fixed node encrypted using an offline private key of the particular fixed node, an identification of the action to be taken (i.e., "rekey" the particular fixed node's online key pair), and a transaction ID. The initiating control node reads the rekey success record from the blockchain, and in response, proceeds to derive blockchain record 806, representing the privileged rekeying action, from blockchain record 802 and from blockchain record 804. Blockchain records 806 representing the privileged rekeying action includes: an ID of the particular fixed node, the offline public key of the particular fixed node, the new online public key of the particular fixed node, and a transaction ID.

As part of block 312 for control-node-initiated fixed node online key pair rekeying, the particular fixed node publishes blockchain record 806, representing the privileged rekeying action, to the blockchain. It may do so by including the representational record in a new block and adding it to its copy of the full blockchain.

As part of block 314 for control-node-initiated fixed node online key pair rekeying, the network implements the requested action. For online key pair rekeying, this can take the form of a node using the new key pair of the fixed node for any network action.

FIG. 9 is a flowchart of a method 900 of blockchain fortified self-initiated fixed node rekeying according to various embodiments. A fixed node may rekey its online key pair using blockchain records 1002, 1004 of FIG. 10 in combination with method 900 as shown and described presently. As an initial step, the fixed node generates a new online key pair, including an online public key and an online private key.

Per block 902 for a fixed node self-rekeying its online key pair, the fixed node forms and broadcasts a blockchain record, or equivalent information, representing the rekeying. An example format suitable for such a blockchain record 1002 is show in FIG. 10. Blockchain record 1002 includes entries of: an ID of the fixed node which online key pair is to be rekeyed, a copy of the new online public key of the rekeyed online key pair, encrypted using the offline private key of the fixed node's offline key pair, an identification of the action to be taken (i.e., "rekey" the fixed node's online key pair), and a transaction ID. The transaction ID may be as described above in reference to FIG. 4.

Per block 904 for self-rekeying of the fixed node's online key pair, the nodes publish blockchain record 1002 or equivalent information. Control nodes may do so by including the representational record in a new block and adding it to their copy of the full blockchain; fixed nodes may add such a block to their individual (partial) copies.

Per block 906 for self-initiated fixed node online key pair revocation, the network implements the requested action. This can include a node not using the fixed node's expired online public key, for example.

Certain examples described above can be performed in part using a computer application or program. The computer program can exist in a variety of forms, both active and inactive. For example, the computer program can exist as one or more software programs, software modules, or both, that can be comprised of program instructions in source code, object code, executable code or other formats, firmware program(s), or hardware description language (HDL) files. Any of the above can be embodied on a computer readable medium, which can include computer readable storage devices and media in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes.

Those skilled in the art will be able to make various modifications to the described examples without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A system for securely communicating between a ground station and an aircraft, the system comprising:
   a plurality of nodes, the plurality of nodes being communicatively interconnected and comprising at least one ground based node and a plurality of aircraft based nodes, each of the plurality of nodes comprising a persistent memory storing at least a respective portion of a blockchain representing interactions among at least some of the plurality of nodes, each of the plurality of nodes comprising a logical partition comprising an online logical part storing an online asymmetric key pair comprising an online public key and an online private key and an offline logical part storing an offline asymmetric key pair comprising an offline public key and an offline private key;
   wherein the plurality of nodes comprise a plurality of control nodes, each of the plurality of control nodes configured to initiate a privileged network action by:
      broadcasting to the plurality of control nodes a blockchain record representing the privileged network action;
      receiving from the plurality of control nodes a plurality of votes representing validation results of the privileged network action;

determining that a consensus from the plurality of control node votes indicates that the privileged action is permissible; and publishing to respective blockchain portions of each of the plurality of nodes a derivation of the blockchain record representing the privileged action;

wherein the system implements the privileged action based on the determining.

2. The system of claim 1, wherein at least some of the plurality of aircraft based nodes comprise Aircraft Communications Addressing and Reporting System (ACARS) line replaceable units (LRUs).

3. The system of claim 1, wherein the privileged network action comprises sending a secure inter-node communication from a sender node to a destination node;

wherein the blockchain record representing the privileged action comprises an identification of the destination node, a message payload encrypted using an online public key of the destination node, and an identification of the sender node encrypted using an online private key of the sender node; and wherein each of the control nodes determines a vote of the plurality of votes by retrieving an online public key and using it to decrypt the identification of the sender node.

4. The system of claim 1, wherein the privileged action comprises registering a new node;

wherein the blockchain record representing the privileged action comprises an identification of the new node, an offline public key of the new node, an online public key of the new node, and a connect value encrypted using an online public key of a respective control node of the broadcasting; and wherein each of the control nodes determines a vote of the plurality of votes by using a respective online private key to decrypt the connect value.

5. The system of claim 1, wherein the plurality of nodes further comprises a plurality of fixed nodes, each of the plurality of fixed nodes configured to initiate a non-privileged action.

6. The system of claim 5, wherein the privileged action comprises revoking a key of a particular fixed node by a revoking control node;

wherein the blockchain record representing the privileged action comprises an identification of the particular fixed node, an identification of a key pair to be revoked, and an identification of the revoking control node encrypted using a private key of the revoking control node; and wherein each of the control nodes determines a vote of the plurality of votes at least by decrypting the identification of the revoking control node.

7. The system of claim 5, wherein the privileged action comprises revoking a key of a particular fixed node by the particular fixed node;

wherein the blockchain record representing the privileged action comprises an identification of the particular fixed node, and an identification of an online key pair to be revoked that is encrypted using an offline private key of the particular fixed node; and wherein each of the control nodes determines a vote of the plurality of votes at least by decrypting the identification of the online key pair to be revoked.

8. The system of claim 5, wherein the privileged action comprises rekeying a key of a particular fixed node initiated by a rekeying control node;

wherein the blockchain record representing the privileged action comprises an identification of the particular fixed node, an online public key of the particular fixed node, and an identification of the rekeying control node encrypted using an online private key of the rekeying control node;

wherein each of the control nodes determines a vote of the plurality of votes at least by decrypting the identification of the rekeying control node;

wherein the particular fixed node is configured to, after the determining and before the publishing, write a rekey success blockchain record comprising an identification of the particular fixed node and a new online public key of the particular fixed node encrypted using an offline private key of the particular fixed node; and wherein the derivation of the blockchain record representing the privileged action comprises an ID of the particular fixed node, a new online public key of the particular fixed node, and an offline public key of the particular fixed node.

9. The system of claim 5, wherein the non-privileged action comprises a self-initiated rekeying by a particular fixed node, the self-initiated rekeying of the particular fixed node comprising:

broadcasting to the plurality of control nodes a blockchain record representing the self-initiated rekeying, the blockchain record comprising an identification of the particular fixed node, and an online public key of the particular fixed node encrypted using an offline private key of the particular fixed node; and publishing to respective blockchain portions of each of the plurality of nodes a blockchain record comprising an identification of the particular fixed node, a new online public key of the particular fixed node, and a new offline public key of the particular fixed node.

10. The system of claim 1, wherein each of the respective portions of the blockchain themselves comprise a blockchain representing network actions involving a respective node.

11. A method of securely communicating between a ground station and an aircraft among a plurality of nodes, the plurality of nodes being communicatively interconnected and comprising at least one ground based node and a plurality of aircraft based nodes, each of the plurality of nodes comprising a persistent memory storing at least a respective portion of a blockchain representing interactions among at least some of the plurality of nodes, each of the plurality of nodes comprising a logical partition comprising an online logical part storing an online asymmetric key pair comprising an online public key and an online private key and an offline logical part storing an offline asymmetric key pair comprising an offline public key and an offline private key, wherein the plurality of nodes comprise a plurality of control nodes, each of the plurality of control nodes configured to initiate a privileged network action by:

broadcasting to the plurality of control nodes a blockchain record representing the privileged network action;

receiving from the plurality of control nodes a plurality of votes representing validation results of the privileged network action;

determining that a consensus from the plurality of control node votes indicates that the privileged action is permissible; and publishing to respective blockchain portions of each of the plurality of nodes a derivation of the blockchain record representing the privileged action;

wherein the privileged action is implemented based on the determining.

12. The method of claim 11, wherein at least some of the plurality of aircraft based nodes comprise Aircraft Communications Addressing and Reporting System (ACARS) line replaceable units (LRUs).

13. The method of claim 11, wherein the privileged network action comprises sending a secure inter-node communication from a sender node to a destination node;
- wherein the blockchain record representing the privileged action comprises an identification of the destination node, a message payload encrypted using an online public key of the destination node, and an identification of the sender node encrypted using an online private key of the sender node; and
- wherein each of the control nodes determines a vote of the plurality of votes by retrieving an online public key and using it to decrypt the identification of the sender node.

14. The method of claim 11, wherein the privileged action comprises registering a new node;
- wherein the blockchain record representing the privileged action comprises an identification of the new node, an offline public key of the new node, an online public key of the new node, and a connect value encrypted using an online public key of a respective control node of the broadcasting; and
- wherein each of the control nodes determines a vote of the plurality of votes by using a respective online private key to decrypt the connect value.

15. The method of claim 11, wherein the plurality of nodes further comprises a plurality of fixed nodes, each of the plurality of fixed nodes configured to initiate a non-privileged action.

16. The method of claim 15, wherein the privileged action comprises revoking a key of a particular fixed node by a revoking control node;
- wherein the blockchain record representing the privileged action comprises an identification of the particular fixed node, an identification of a key pair to be revoked, and an identification of the revoking control node encrypted using a private key of the revoking control node; and
- wherein each of the control nodes determines a vote of the plurality of votes at least by decrypting the identification of the revoking control node.

17. The method of claim 15, wherein the privileged action comprises revoking a key of a particular fixed node by the particular fixed node;
- wherein the blockchain record representing the privileged action comprises an identification of the particular fixed node, and an identification of an online key pair to be revoked that is encrypted using an offline private key of the particular fixed node; and
- wherein each of the control nodes determines a vote of the plurality of votes at least by decrypting the identification of the online key pair to be revoked.

18. The method of claim 15, wherein the privileged action comprises rekeying a key of a particular fixed node initiated by a rekeying control node;
- wherein the blockchain record representing the privileged action comprises an identification of the particular fixed node, an online public key of the particular fixed node, and an identification of the rekeying control node encrypted using an online private key of the rekeying control node; and
- wherein each of the control nodes determines a vote of the plurality of votes at least by decrypting the identification of the rekeying control node;
- the method further comprising, after the determining and before the publishing, writing, by the particular fixed node, a rekey success blockchain record comprising an identification of the particular fixed node and a new online public key of the particular fixed node encrypted using an offline private key of the particular fixed node;
- wherein the derivation of the blockchain record representing the privileged action comprises an ID of the particular fixed node, a new online public key of the particular fixed node, and an offline public key of the particular fixed node.

19. The method of claim 15, wherein the non-privileged action comprises a self-initiated rekeying by a particular fixed node, the self-initiated rekeying of the particular fixed node comprising:
- broadcasting to the plurality of control nodes a blockchain record representing the self-initiated rekeying, the blockchain record comprising an identification of the particular fixed node, and an online public key of the particular fixed node encrypted using an offline private key of the particular fixed node; and
- publishing to respective blockchain portions of each of the plurality of nodes a blockchain record comprising an identification of the particular fixed node, a new online public key of the particular fixed node, and a new offline public key of the particular fixed node.

20. The method of claim 11, wherein each of the respective portions of the blockchain themselves comprise a blockchain representing network actions involving a respective node.

* * * * *